2,995,495
STABLE SOLUTION OF VITAMIN A-ASCORBIC ACID COMPLEX IN ALCOHOL AND PROCESS OF PREPARING SAID SOLUTIONS

Guido Pancrazio and Mario Vitali, Rome, Italy, assignors to Orma Istituto Terapeutico Romano I.T.R. S.r.l., Rome, Italy, a company of Italy
No Drawing. Filed Apr. 30, 1959, Ser. No. 809,925
Claims priority, application Italy May 6, 1958
5 Claims. (Cl. 167—81)

The present invention relates to a stable solution of vitamin A in alcohol, and to a process for preparing said solution.

It is known that when the free or esterified vitamin A is dissolved in ethyl alcohol, solutions are obtained where the vitamin A rapidly alters. The addition of the commonly used stabilizers for the oil solutions of vitamin A, such as hydroquinone, tocopherol, N.D.G.A., and so on, has no stabilizing effect on the alcohol solutions.

It has now been found that by reacting in absolute ethyl alcohol the either free or esterified vitamin A with ascorbic acid, one mol of vitamin A and one mol of ascorbic acid form a compound or complex which is very soluble in alcohol, said compound or complex being surprisingly very stable in alcohol solution.

The reaction may be carried out either at the boiling temperature of the alcohol, or at lower temperature, suitably making longer the reaction times.

The existence of this compound is demonstrated in that:

(1) Between the vitamin A and the ascorbic acid, in absolute ethyl alcohol, a chemical reaction occurs as it is demonstrated by suspending in 100 ml. of absolute ethyl alcohol 17 g. of vitamin A palmitate (1,700,000 I.U./g.) and equimolecular amounts of ascorbic acid (about 6 g.); after 8 hours of gently boiling in nitrogen ambient, a complete solution is obtained, wherefrom a precipitate is cold obtained consisting of pure palmitic acid, while the vitamin A and the ascorbic acid remain in solution.

(2) The solubility in alcohol is greatly enhanced both with respect to that of the esters of the vitamin A, and with respect to that of the ascorbic acid.

(3) The rotatory power of the alcohol solutions of the compound or complex is $+120°$, while the ascorbic acid under the same conditions shows $+60°$ and the vitamin A shows no rotation.

(4) The alcohol solutions of the compound or complex of vitamin A-alcohol and vitamin C do not show the spectrophotometric curve in the U.V. light of the vitamin A-alcohol, but a curve similar to that of an ester of vitamin A.

(5) When an alcohol solution of this compound or complex is carried to dryness, a solid residue having an orange-yellow color is obtained and this residue may be quickly cold dissolved in little absolute ethyl alcohol.

The solutions in absolute alcohol of this compound or complex, maintain the vitamin A in very stable form through extended periods of time. The tests were carried out sealing the solutions into dark neutral glass vials, and submitting said solutions to stability tests through certain periods of time. The results are as follows:

Under room temperature, after 9 months, is found a titre loss of vitamin A less than 2%.

At 55° C., after 4 months the average loss is less than 5%.

The various preparations so obtained may be aromatized with the various aromatizing agents usually used for the oil and/or aqueous solutions of vitamin A.

More specifically, this compound or complex is prepared treating in nitrogen atmosphere and under stirring, either at the boiling temperature of the alcohol or at lower temperatures, a suspension in absolute alcohol of vitamin A-alcohol or acetate or palmitate, or the like, and of ascorbic acid in equimolecular ratios; the amount of the absolute alcohol depends upon the titration to be reached. Also, it will be possible to prepare a more concentrated solution, diluting then said concentrated solution to the desired titration with absolute ethyl alcohol.

Thus, solutions can be prepared having a titration from 1,000 I.U./ml., up to 400,000 I.U./ml., and more.

If so requested, to the alcohol may be added amounts up to 30% by volume of ethyl oleate or similar solvents.

The vitamin A-alcohol can be pure, or obtained by saponification from any ester, be it either pure or concentrated, and natural or synthetic. The vitamin A-acetate can be either pure or it may be a common, natural or synthetic oil concentrate, having a high titration; and this applies also for the other esters of vitamin A, as the palmitate.

If vitamin A-palmitate is used, it will be necessary at the end of the reaction to leave the solution to stand for some days in a refrigerator, and to filter out then the palmitic acid which is thus freed.

The product according to this invention may find its application in all the cases where solutions of vitamin A by oral way are indicated, f.i. for the treatment of growth diseases, epithelial alterations, hyperthyroidism and so on.

The present invention will be now disclosed with reference to two preferred exemplary embodiments, as follows:

EXAMPLE 1

*Preparation of a stable solution having the titre of 9,500 I.U./ml of vitamin A*

Into a 200 ml., three necked glass flask, provided with glass stirrer with mercury valve, inlet tube for dry purified nitrogen and reflux cooler closed at its outlet by a Bunsen valve, were introduced:

Vitamin A (axerophtol) _____ 1,000,000 I.U.
Ascorbic acid _____ 184.5 mg.
Absolute ethyl alcohol _____ The balance to 100 ml.

The mix was boiled with little reflux, under stirring, and under a nitrogen stream through 8 hours. Then the product was allowed to cool, maintaining the nitrogen stream, the volume was tested and it was completed to 100 ml. with absolute ethyl alcohol.

The resultant solution was orange-red colored (from a lemon yellow initial color) and its absorption curve for the U.V. light in ethyl alcohol resembled that of an ester of vitamin A with $\lambda_{max}=326$ m$\mu$.

This solution when analyzed after 9 months of stand at 20° showed no variation either in the titre of vitamin A or in the absorption curve for U.V. light.

Two reaction experiments were carried out identically to the one above disclosed, with the exception that the vitamin A-acetate was substituted for the axerophtol, and 30 cc. of ethyl oleate were substituted for an equal volume of absolute ethyl alcohol respectively. The results obtained in both cases were absolutely equal to those as above disclosed.

EXAMPLE 2

*Preparation of a stable solution having the titre of 400,000 I.U./ml. of vitamin A*

(A) *With axerophtol.*—Into the flask according to Example 1 were introduced:

Pure vitamin A_____ 42,000,000 I.U.
Ascorbic acid_____ 7.750 g.
Ethyl alcohol_____ The balance to 100 ml.

The mix was boiled with little reflux through 8 hours, under stirring and under nitrogen stream, leaving then the mix to cool under nitrogen stream, finally testing the volume and carrying the latter to 100 ml. with absolute alcohol.

The obtained solution had a color deeper than that of Example 1, a rotatory power of 102° and an absorption curve equal to that of Example 1. This solution was held out from the contact with air in a thermostat at 55° C., for 4 months; when analyzed, said solution showed a titre of 384,000 I.U./ml., corresponding to a 4% loss.

Other reaction runs caried out as above set out, but substituting for the vitamin A an oil superconcentrated solution, or using axerophtol acetate, or substituting for 30 ml. of absolute ethyl alcohol an equal volume of ethyl oleate, or maintaining the reaction mix at 50° C. for 24 hours under stirring (instead of maintaining said mix for 8 hours at reflux boiling) gave results identical to those above indicated.

(B) *With axerophtol palmitate.*—Into the flask according to Example 1 were introduced:

Pure vitamin A palmitate_____ 42,000,000 I.U.
Ascorbic acid_____ 7.750 g.
Absolute ethyl alcohol_____ The balance to 80 ml.

The mixture was boiled under little reflux for 8 hours with stirring under nitrogen stream. The mix was allowed to cool, while the cooler, the stirrer and the inlet pipe for the nitrogen were removed. The flask was tightly closed in nitrogen atmosphere and held in a freezer through 48 hours. The formed palmitic acid precipitate was filtered out under nitrogen atmosphere, said precipitate was washed with little cold ethyl alcohol, then it was added to the filtrate, the volume thereof was tested and carried to 100 ml. with absolute ethyl alcohol.

The obtained solution had a deep orange-red color, and had features quite similar to those of the product obtained under (A) of this example.

We claim:

1. A stable solution of vitamin A in alcohol, said solution having a titre from 1,000 to 500,000 I.U. and said vitamin A being in the form of a complex with ascorbic acid.

2. Vitamin A-ascorbic acid complex.

3. A process for preparing a biologically active derivative of vitamin A which consists essentially of reacting in absolute ethyl alcohol (1) vitamin A with (2) ascorbic acid.

4. A process for preparing a new biologically active derivative of vitamin A which consists essentially of heating, in a nitrogen atmosphere, under agitation and in absolute ethyl alcohol, an equimolecular mixture of ascorbic acid and vitamin A, said vitamin A being selected from the group consisting of vitamin A alcohol, vitamin A acetate and vitamin A palmitate.

5. A process for preparing highly time-stable alcohol solutions of vitamin A having a biological activity from 1,000 to 400,000 I.U./ml., which process consists of dissolving in absolute ethyl alcohol the corresponding amount of vitamin A-ascorbic acid complex.

References Cited in the file of this patent

Patel: Chem. Abst., vol. 49, 1955, p. 8557i.
Giral, J. Am. Pharm. Assn. (Sci. Ed.), March 1947, pp. 82–84.